United States Patent [19]

Walters

[11] 4,009,689

[45] Mar. 1, 1977

[54] ROTARY COMBUSTION ENGINE EXHAUST GAS RECIRCULATION SYSTEM

[75] Inventor: Leslie K. Walters, Rochester, Mich.

[73] Assignee: General Motors Corporation, Detroit, Mich.

[22] Filed: May 2, 1975

[21] Appl. No.: 573,909

[52] U.S. Cl. ............... 123/8.13; 60/901; 123/119 A; 123/8.45

[51] Int. Cl.² ......................... F02B 53/10

[58] Field of Search ............ 60/901, 273, 274, 278, 60/279; 123/119 A, 8.13, 8.09

[56] References Cited

UNITED STATES PATENTS

| | | | |
|---|---|---|---|
| 3,783,839 | 1/1974 | Shimizu | 123/119 A |
| 3,795,228 | 3/1974 | Shimizu | 60/901 |
| 3,800,764 | 4/1974 | Mizuno | 123/119 A |
| 3,834,363 | 9/1974 | Goto | 123/119 A |
| 3,844,260 | 10/1974 | Scott | 123/119 A |
| 3,844,261 | 10/1974 | Garcea | 123/119 A |
| 3,867,910 | 2/1975 | Galonska | 123/119 A |
| 3,901,202 | 8/1975 | Hollis | 123/119 A |

Primary Examiner—Clarence R. Gordon
Attorney, Agent, or Firm—Ronald L. Phillips

[57] ABSTRACT

A rotary combustion engine is provided with an exhaust gas recirculation system that is responsive to both exhaust gas pressure and inlet vacuum and is operable to connect the working chambers adjacent their trailing end to the intake port through a variable size opening only when the chambers are nearing the end of the exhaust phase so that the differential between the pressure of the exhaust gases and the inlet mixture causes exhaust gases rich in unburned hydrocarbons in the trailing region of the chambers during the exhaust phase to flow at a rate increasing with decreasing inlet vacuum to the inlet port and thereafter be recirculated through the intake, compression and expansion phases.

3 Claims, 1 Drawing Figure

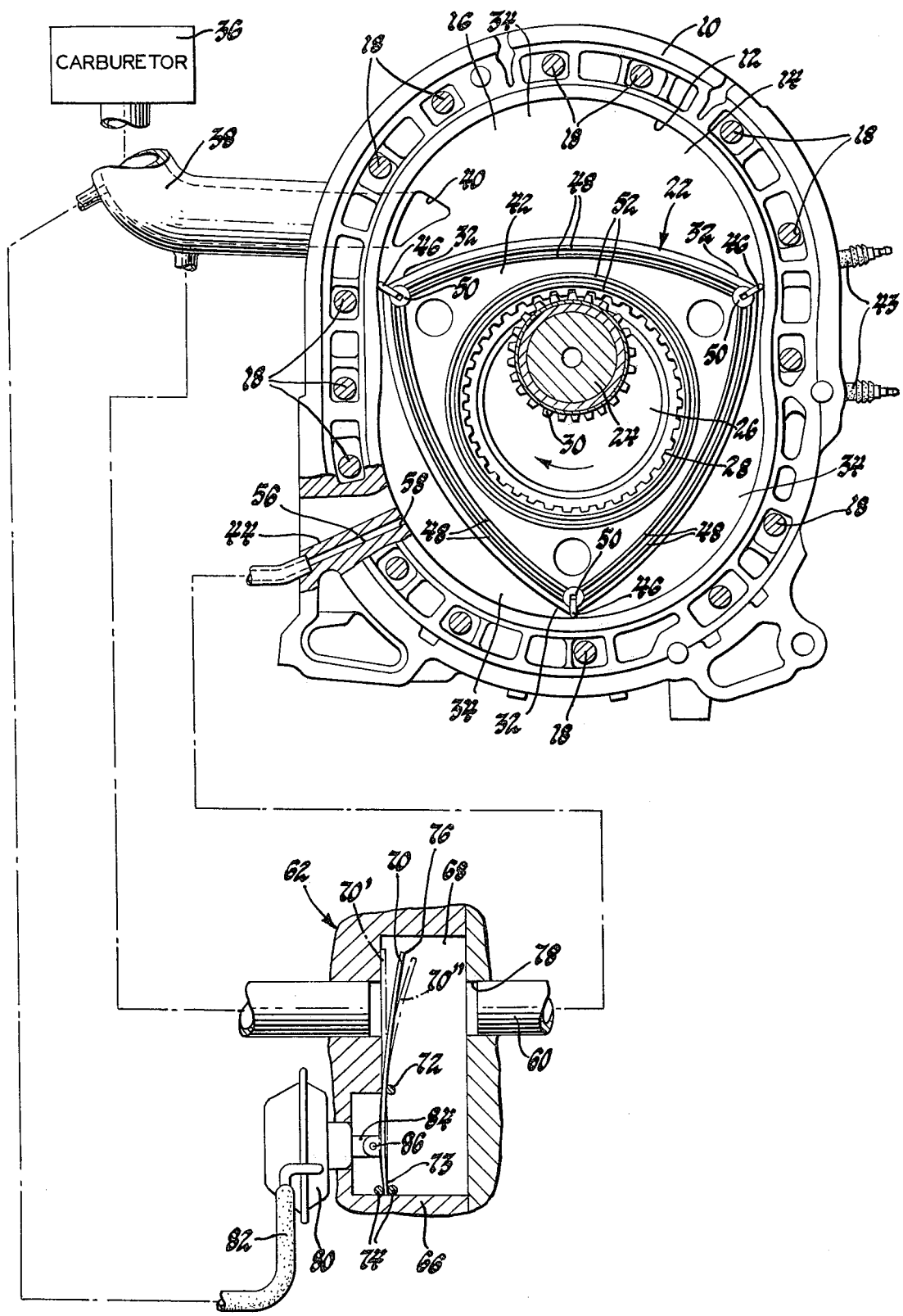

ROTARY COMBUSTION ENGINE EXHAUST GAS RECIRCULATION SYSTEM

This invention relates to a rotary combustion engine exhaust gas recirculation system and more particularly to such a system wherein only the rich ladened hydrocarbon mixture in the trailing region of the chambers is recirculated and at a rate which increases with decreasing inlet vacuum.

In the currently produced rotary combustion engine of the planetary rotor type as herein disclosed it is known that certain undesired exhaust gas emissions can be reduced like in reciprocating piston engines with exhaust gas recirculation. In piston engines, this process has the effect of mainly reducing CO and $NO_x$ and the same is true in rotary engines when the recirculated gas is extracted downstream of the exhaust port. However, in the rotary engine the chambers move with the rotor unlike the stationary chambers in a piston engine and it has been found that there can be a substantially higher percentage of unburned HC in the trailing region of the chambers. Therefore substantial HC reduction which is so hard sought in this engine can result from recirculating exhaust gases just from the trailing region of the working chambers.

In the exhaust gas recirculation system according to the present invention a port is provided in the rotor housing's inner peripheral wall just forward of the normal exhaust port and a valve responsive to both exhaust pressure and inlet vacuum is connected between this port and the engine's intake port. The valve senses the exhaust pressure and opens just during the last portion of the exhaust phase so that primarily a rich ladened hydrocarbon mixture is extracted from the exhaust and recirculated into the engine inlet. In addition, the valve opening is modulated by the inlet vacuum to give desirably higher exhaust gas recirculation flow at lower inlet vacuum, i.e. higher torque.

An object of the present invention is to provide a new and improved rotary combustion engine exhaust gas recirculation system.

Another object is to provide in a rotary combustion engine an exhaust gas recirculation system wherein primarily those exhaust gases rich in unburned hydrocarbons in the trailing region of the chambers are recirculated through the intake, compression and expansion phases and at a rate that increases with decreasing inlet vacuum.

Another object is to provide in a rotary combustion engine an exhaust gas recirculation system having a valve that is responsive to exhaust gas pressure and inlet vacuum and is operable to open in response to decreasing exhaust gas pressure during the exhaust phase of the chambers to effect recirculation of primarily those exhaust gases rich in unburned hydrocarbons in the trailing region of the chambers through the intake, compression and expansion phases wherein the recirculation rate increases with decreasing inlet vacuum.

These and other objects of the present invention will become more apparent from the following description and drawing in which:

There appears an end elevation view with some parts removed, some parts shown in cross-section and some parts shown schematically of an exhaust gas recirculation system according to the present invention.

The exhaust gas recirculation system according to the present invention is disclosed in a rotary combustion engine of current production type as shown in FIG. 1. The engine comprises a rotor housing 10 having an inner peripheral wall 12 and a pair of end housings 14, only one of which is shown, having oppositely facing side walls 16. The housings are secured together by bolts 18 and the inner peripheral wall 12 commonly conforms to a curve outside of and parallel to a two-lobe epitrochoid and cooperates with the side walls 16 to provide a cavity in which a generally triangularly shaped rotor 22 is mounted. A crankshaft 24 extends through the cavity and is journaled near its opposite ends in the end housings 14. The rotor 22 is rotatably supported on an eccentric 26 formed on the crankshaft 24 and has a concentrically located internal tooth rotary phasing gear 28 on one side which meshes with an external tooth annular stationary phasing gear 30 which is concentric with the crankshaft and is secured by suitable means to one of the end housings. The rotary phasing gear 28 has one and one-half times the number of teeth as the stationary phasing gear 30 so that there is enforced a fixed phase relationship between the rotor and the crankshaft and housing wherein each of the three rotor apexes 32 remain adjacent the peripheral wall 12 as the rotor rotates and there is defined between these apexes a total of three expansible chambers 34 that move with the rotor while expanding and contracting twice during each rotor revolution in fixed relation to the housing.

A combustible fuel mixture is delivered to the chambers 34 from a carburetor 36 through an intake manifold 38 and oppositely facing side intake ports 40 which are formed in the side walls 16. The intake ports 40 are arranged such that they are opened to the chambers past the rotor sides 42 as the chambers expand in an intake phase and are thereafter closed by the rotor sides when these chambers then contract to compress the mixture in a compression phase as the rotor turns in the direction of the arrow. At the end of the compression phase, the compressed mixture is ignited by one or two spark plugs 43 which are mounted on the rotor housing 10 in peripherally spaced leading and trailing locations with their electrodes open to the chambers through the peripheral wall 12. Upon combustion, the chambers expand in a power or expansion phase and thereafter are exhausted as they contract in an exhaust phase by an exhaust port 44 through the peripheral wall 12 which is traversed by the rotor apexes.

Typically, the working chambers 34 are sealed by an arrangement comprising an apex seal 46 mounted in a slot across each rotor apex, a pair of parallel side seals 48 mounted in grooves in each rotor side 42 adjacent each rotor flank and a corner seal 50 mounted in a hole in each rotor side at each apex that provides a sealing link between the adjacent ends of the side seals and apex seal at each apex. In this arrangement the apex seals 46 are forced radially outward to engage the peripheral wall 12 and the side seals 48 and corner seals 50 are forced axially outward to engage the opposite side wall. In addition to the gas sealing arrangement, there is also normally provided a pair of oil seals 52 which are mounted in concentric grooves in each rotor side and forced axially outward to engage the opposite side wall to prevent the oil used for lubrication of the crankshaft, rotor, etc., from reaching the working chambers.

The engine structure thus far described is conventional and for purposes of understanding the present invention it is important to recognize that in this engine the last portion of the exhaust is rich in unburned hydrocarbons, i.e., there is a rich ladened hydrocarbon mixture in the trailing region of the working chambers during their exhaust phase. According to the present invention this characteristic is utilized to effect a reduction in HC in addition to the reduction of CO and $NO_x$ which is normally provided by exhaust gas recirculation.

In the preferred embodiment of the present invention, an exhaust gas recirculation passage 56 is formed in the rotor housing 10 with an inlet port 58 in the rotor housing's inner peripheral wall 12 just forward of the exhaust port 44 relative to rotor rotation. The recirculation passage 56 extends radially outward through the rotor housing and is connected to the intake manifold 38 through a line 60 having an exhaust gas recirculation valve 62. The valve 62 comprises a valve body 66 having a chamber 68 which is ported on opposite sides to connect the line 60 through the valve. A spring steel reed valve member 70 is located in the chamber 68 and is pivotably mounted at an intermediate location about a traversely extending pin 72 that is secured at its opposite ends to the valve body. The lower valve member end 73 is restrained between two pins 74 secured to the valve body and the other valve member end 76 is movable to open and close the chamber outlet port 78 to the line 60. The valve mamber 70 in a relaxed state has a bent configuration as shown in full-line so that the valve portion 76 then opens the outlet port 78. The valve member 70 is calibrated so that at the beginning of the exhaust phase of the chambers the then existing high exhaust gas pressure delivered to the chamber 68 is effective to flex the valve sufficiently to close the outlet port 78 as shown by the phantom-line valve position 70'. But then as the exhaust phase continues and the exhaust gas pressure decreases, the spring force eventually overcomes the exhaust gas pressure to permit the valve to return to an open position thereby opening line 60, the spring force being such that this opening event occurs during the last portion of the exhaust phase when the trailing region of the chambers is in the immediate vicinity of the recirculation inlet port 58. In addition to this controlled opening and closing of the valve 70 by sensing exhaust gas pressure, there is provided a vacuum motor 80 which is connected by a line 82 to the intake manifold 38. The output rod 84 of the vacuum motor is secured by a pivot connection 86 to the spring valve member 70 intermediate its two mounting locations 72 and 74. A spring, not shown, in the motor urges the rod 84 leftward while manifold vacuum acts on the right side of a diaphragm, also not shown, in the motor to effect a pressure differential opposing the spring bias to urge the rod rightward. These biases are determined so that on decreasing manifold vacuum, i.e. increasing torque, the rod pulls on the valve member causing it to open wider relative to the outlet port 78 as shown by the phantom-line valve position 70'' to thereby increase the exhaust gas recirculation flow rate.

With the above exhaust gas recirculation system and during the exhaust phase of the working chambers, the valve 70 thus senses the decreasing exhaust pressure and opens just during the last portion of this phase to connect the chambers to the intake near their trailing end and ahead of the exhaust port. The difference between the pressure of the exhaust gases and the inlet mixture then causes exhaust gases rich in unburned hydrocarbons in the trailing region of each chamber to flow to the intake ports and thereafter be recirculated through the intake, compression and exhaust phases rather than being swept out the exhaust port. Furthermore, as manifold vacuum decreases with greater torque demand and this demand is met by increased mixture delivery, the vacuum motor 80 operates to increase the variable size opening provided by the valve 70 so that the recirculated exhaust gas flow also increases.

The above described embodiment is illustrative of the invention which may be modified within the scope of the appended claims.

I claim:

1. A rotary combustion engine comprising housing means having an internal peripheral wall and oppositely facing side walls, a rotor rotatably mounted in said housing means with sides facing said side walls and apexes that remain adjacent said peripheral wall as said rotor rotates, said rotor and said walls cooperatively providing a plurality of chambers that are spaced about and move with said rotor while varying in volume, said housing means having an intake port openable by said rotor to said chambers for delivering a combustible gaseous mixture to said chambers as they expand in an intake phase, ignition means for igniting the mixture is said chambers following a compression phase whereupon they expand in an expansion phase, said housing means having an exhaust port openable by said rotor to said chambers for exhausting said chambers as they contract in an exhaust phase, and exhaust gas recirculation means including pressure responsive valve means responsive to both exhaust gas pressure and intake vacuum for sequentially connecting said chambers adjacent their trailing end to said intake port only below a predetermined exhaust gas pressure that occurs when said chambers are nearing the end of their exhaust phase and only then through a variable size opening that increases in size with decreasing intake vacuum whereby the differential between the pressure of the exhaust gases and the intake mixture then causes exhaust gases rich in unburned hydrocarbons in the trailing region of each chamber to flow to said intake port and thereafter be recirculated through the intake, compression and expansion phases and whereby the recirculated exhaust gas flow increases with decreasing intake vacuum.

2. A rotary combustion engine comprising housing means having an internal peripheral wall and oppositely facing side walls, a rotor rotatably mounted in said housing means with sides facing said side walls and apexes that remain adjacent said peripheral wall as said rotor rotates, said rotor and said walls cooperatively providing a plurality of chambers that are spaced about and move with said rotor while varying in volume, said housing means having an intake port openable by said rotor to said chambers for delivering a combustible gaseous mixture to said chambers as they expand in an intake phase, ignition means for igniting the mixture in said chambers following a compression phase whereupon they expand in an expansion phase, said housing means having an exhaust port openable by said rotor to said chambers for exhausting said chambers as they contract in an exhaust phase, valve means responsive to decreasing exhaust gas pressure to sequentially open said chambers adjacent their trailing end to said intake port only below a predetermined exhaust gas pressure that occurs when said chambers are nearing the end of their exhaust phase, and vacuum motor means responsive to intake vacuum to increase the size opening of said valve means with decreasing intake vacuum.

3. A rotary combustion engine comprising housing means having an internal peripheral wall and oppositely facing side walls, a rotor rotatably mounted in said housing means with sides facing said side walls and apexes that remain adjacent said peripheral wall as said rotor rotates, said rotor and said walls cooperatively providing a plurality of chambers that are spaced about and move with said rotor while varying in volume, said housing means having an intake port openable by said rotor to said chambers for delivering a combustible gaseous mixture to said chambers as they expand in an intake phase, ignition means for igniting the mixture in said chambers following a compression phase whereupon they expand in an expansion phase, said housing means having an exhaust port openable by said rotor to said chambers for exhausting said chambers as they contract in an exhaust phase, a line connected at one end to said inlet port and at the other end having an inlet in said housing means forward of said exhaust port relative to rotor rotation so as to also be openable by said rotor to said chambers in the exhaust phase but closer than said exhaust port to the trailing end of said chambers, valve means in said line responsive to decreasing exhaust gas pressure to open said line each time the then exhausting chamber is nearing the end of its exhaust phase, and vacuum motor means responsive to intake vacuum to increase the instantaneous size opening of said valve means with decreasing intake vacuum.

* * * * *